US011826827B2

(12) United States Patent
Gu et al.

(10) Patent No.: US 11,826,827 B2
(45) Date of Patent: Nov. 28, 2023

(54) COAXIAL POWDER-FEEDING NOZZLE USED FOR ADDITIVE MANUFACTURING ON INNER WALL AND HAVING SELF-CLEANING FUNCTION

(71) Applicant: NANJING UNIVERSITY OF AERONAUTICS AND ASTRONAUTICS, Nanjing (CN)

(72) Inventors: Dongdong Gu, Nanjing (CN); Xinyu Shi, Nanjing (CN); Yanze Li, Nanjing (CN); Donghua Dai, Nanjing (CN); Qing Ge, Nanjing (CN); Yixuan Sun, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 2 days.

(21) Appl. No.: 18/000,830

(22) PCT Filed: Oct. 21, 2021

(86) PCT No.: PCT/CN2021/125247
§ 371 (c)(1),
(2) Date: Dec. 6, 2022

(87) PCT Pub. No.: WO2022/083681
PCT Pub. Date: Apr. 28, 2022

(65) Prior Publication Data
US 2023/0191494 A1 Jun. 22, 2023

(30) Foreign Application Priority Data

Oct. 23, 2020 (CN) .......................... 202011150358.4

(51) Int. Cl.
*B22F 12/53* (2021.01)
*B33Y 30/00* (2015.01)
(Continued)

(52) U.S. Cl.
CPC .............. *B22F 12/53* (2021.01); *B29C 64/35* (2017.08); *B33Y 30/00* (2014.12); *B29C 64/209* (2017.08)

(58) Field of Classification Search
CPC .......... B22F 12/53; B22F 10/73; B29C 64/35; B29C 64/209; B33Y 30/00; B28B 1/001;
(Continued)

(56) References Cited

U.S. PATENT DOCUMENTS

| 867,006 A | * | 9/1907 | Bogenschild | ............. B08B 5/02 15/80 |
| 2016/0271887 A1 | | 9/2016 | Shi et al. | |
| 2022/0118523 A1 | * | 4/2022 | Sebal | ................... B23K 26/342 |

FOREIGN PATENT DOCUMENTS

| CN | 107626163 A | 1/2018 |
| CN | 110280763 A | 9/2019 |

(Continued)

OTHER PUBLICATIONS

International Search Report and Written Opinion of the International Searching Authority issued in International Application No. PCT/CN2021/125247, dated Jan. 26, 2022, 15 pgs.

*Primary Examiner* — Susan D Leong
*Assistant Examiner* — Xinwen Ye
(74) *Attorney, Agent, or Firm* — HAUPTMAN HAM, LLP

(57) ABSTRACT

A coaxial powder-feeding nozzle includes a partition wall-type shell, a powder flow area, a cooling liquid flow area and a shielding gas conveying channel. A powder self-cleaning filter is on the outer side of the partition wall-type shell; the powder self-cleaning filter includes a set of powder collecting tubes on each side of the partition wall-type shell in the axial direction; each set of powder collecting tubes includes at least one powder collecting tube; under the coaction of a suction force applied by a powder collecting system and the
(Continued)

self-weight of residual powder, a residual powder inlet of each powder collecting tube causes the residual powder on the opposite side to roll down to the bottom along the wall surface of a metal tube to be processed on the same side, and to be gathered at the front end of the residual powder inlet of the powder collecting tube.

10 Claims, 6 Drawing Sheets

(51) Int. Cl.
  *B29C 64/35* (2017.01)
  *B29C 64/209* (2017.01)
(58) Field of Classification Search
  CPC ......... B08B 5/02; B08B 17/00; B08B 17/025; B05B 15/55
  See application file for complete search history.

(56) References Cited

FOREIGN PATENT DOCUMENTS

| | | | |
|---|---|---|---|
| CN | 112139502 A | | 12/2020 |
| DE | 102018206358 A1 | | 10/2019 |
| KR | 20190055507 A | * | 5/2019 |
| KR | 20190055507 A | | 5/2019 |

* cited by examiner

COAXIAL POWDER-FEEDING NOZZLE USED FOR ADDITIVE MANUFACTURING ON INNER WALL AND HAVING SELF-CLEANING FUNCTION

RELATED APPLICATIONS

The present application is a U.S. National Phase of International Application Number PCT/CN2021/125247, filed Oct. 21, 2021, and claims priority to Chinese Application Number 202011150358.4, filed Oct. 23, 2020.

TECHNICAL FIELD

The present disclosure relates to a nozzle having self-cleaning function and a system thereof, which belongs to the field of laser processing.

BACKGROUND

Since the invention of laser, it has been increasingly used in advanced manufacturing technology. Laser deposition, laser drilling, laser cleaning, laser cutting, laser welding and the like have all received extensive attention, which are of precise and efficient processing properties so that the laser processing are more energy-saving and environmentally friendly. Laser processing has become the hot spot having the top priority in research and development in countries.

Among many laser-related processing technologies, laser deposition is one of the more important and widely used technology. The application scope of laser deposition, also known as laser cladding, mainly includes surface modification of materials, repair and regeneration of workpieces and 3D rapid prototyping. The laser deposition adds deposition materials to the substrate or the previous deposition layer, and applies high-energy laser beam on it to melt the substrate and deposition materials to combine them, so as to solidify and form an additive deposition layer. During the processing, compared with the traditional processes, it has a lower input thermal energy, a smaller heat-affected zone, a smaller deformation degree and a finer structure, so that it is widely used in the fields, such as aerospace, military, industry, agriculture and the like.

Existing deposition can be roughly divided into pre-coating and synchronous powder feeding. The pre-coating deposition process is complex, it is not easy to be processed on complex surfaces, and the dilution rate is difficult to control. Synchronous powder feeding is roughly divided into two categories: lateral powder feeding and coaxial powder feeding. For lateral powder feeding, it is difficult to obtain a relatively stable overlapping area of the laser and powder effecting areas, and it is difficult to process the tracks with bend angles and arcs. During the deposition process, the coaxial injecting improves the utilization rate of the powder, reduces the dilution rate, improves the accuracy and controllability of the deposition process, and makes the processing track more flexible through the real-time convergence of the powder and the laser beam, which provides conditions for laser rapid prototyping by injecting powder.

In many extreme conditions, in order to prolong the service life of key metal members, the inner-wall protective layer is also required to be clad in the elongated metal tube. By modifying the inner surface of the metal tube, the wear resistance and corrosion resistance of the inner wall of the metal tube are increased. In order to increase the strength and stiffness of the metal tube in certain directions, or to manufacture certain special complex structures in the metal tube, it is necessary to carry out the inner wall additive manufacturing on the inner wall of the metal tube through the coaxial nozzle, and carry out the inner wall additive manufacturing of special three-dimensional structures in the planned tracks or areas.

However, the best processing position of the coaxial nozzle is right above the substrate with one focal length of powder beams from the substrate when the coaxial nozzle is perpendicular to the ground, where the nozzle conducts the inner wall additive manufacturing perpendicularly downwards. When the nozzle is inclined, the powder is prone to the eccentric convergence. When additive manufacturing is conducted on the inner wall of the metal tube, due to the effect of gravity, the powder that is not used during the processing will slide down to the bottom of the tube along both sides of the inner wall, which, when not being cleaned or collected in time, will cause the powder accumulation and coverage on the forming area in the inner wall during the additive manufacturing process, and it is difficult to control the key forming process parameters, such as the actual inner wall deposition powder volume, molten pool depth, dilution rate, and the like, thereby greatly reducing the deposition quality. However, when the nozzle is inclined to avoid the bottom of the tube for processing, it is difficult to guarantee the quality of deposition due to the poor quality of powder convergence. In the process of manual cleaning of the accumulated powder, due to the long interrupting operation time of the laser heat source, the high-temperature metal cooling process will have a significant dimensional-shrinkage effect, which greatly reduces the dimensional accuracy of the complex structure of the inner wall and significantly prolongs the manufacturing cycle. Therefore, in the process of inner wall additive manufacturing, designing an inner-wall nozzle with self-cleaning function has obviously economic and social benefits for efficient and high-quality inner wall additive manufacturing.

SUMMARY

The main objective of the present disclosure is to provide a coaxial powder feeding nozzle having self-cleaning capability in the inner wall additive environment, addressing the problems that the unutilized powder accumulates in the metal tube during the inner wall additive manufacturing process, which affects the processing and is difficult to clean.

In order to achieve the above-mentioned technical objective, the following technical solutions are adopted in the present disclosure.

A coaxial powder-feeding nozzle used for additive manufacturing on an inner wall and having a self-cleaning function, includes an injecting-tube body. The injecting-tube body includes a partition-wall-type shell, a powder flow area, a cooling liquid flow area and a shielding gas conveying channel. The partition-wall-type shell includes a partition wall a and a partition wall b. The partition wall b is located outside the partition wall a. The powder flow area is arranged in the partition wall a. The cooling liquid flow area is arranged in the partition wall b. The powder flow area is provided with a powder inlet and a shielding gas inlet. The cooling liquid flow area is provided with a cooling liquid inlet. A powder-collecting self-cleaning filter is arranged outside the partition-wall-type shell.

The powder-collecting self-cleaning filter is equipped with a set of powder collecting tubes respectively arranged on two sides of the partition-wall-type shell with respect to an axial direction, and each set of the powder collecting tubes includes at least one powder collecting tube.

Each powder collecting tube is in a two-section structure, which includes an upper tube section adopted in a straight-tube shape and a lower tube section adopted in a bent-tube shape. The upper tube section is fixed to an outer wall of the partition-wall-type shell, and an upper end of the upper tube section is provided with a connector. The connector is capable of being connected with a powder collecting system. A lower end of the lower tube section is a residual-powder inlet. The residual-powder inlet is arranged below a metal tube to be processed, and is located outside a powder convergence point of the metal tube to be processed with respect to the axial direction.

Preferably, a distance h between the residual-powder inlet and a bottom of the metal tube to be processed satisfies:

$$h \le \frac{r\sqrt{n\eta}\left(\sqrt{v_r} - 1.5\sqrt{u_q}\right)}{1.5\sqrt{u_q}},$$

where n denotes a number of powder inlets in communication with the powder flow area; r denotes a radius of the powder inlets; $\eta$ denotes a volume fraction of residual powder particles to total powder particles passed through each powder inlet; $v_r$ denotes an airflow velocity at a top of the upper tube section; and $u_q$ is a starting velocity of the powder particles, wherein $$u_q = 2.44\sqrt{\frac{d_s(\rho_s - \rho)}{\rho}},$$

and
a range of the airflow velocity is as follows:

$$10.90\sqrt{\frac{d_s(\rho_s - \rho)}{\rho}} \le v_r \le 19.07\sqrt{\frac{d_s(\rho_s - \rho)}{\rho}},$$

where $d_s$ denotes a maximum particle size of the powder particles, $\rho_s$ denotes a density of the powder particle material, and $\rho$ denotes a density of conveying gas.

Preferably, the radius R of the residual-powder inlet satisfies:

$$R = r\sqrt{n\eta},$$

where n denotes the number of the powder inlets in communication with the powder flow area; r denotes the radius of the powder inlets; $\eta$ denotes the volume fraction of the residual powder particles to the total powder particles passed through each powder inlet.

Preferably, a trajectory profile of the lower tube section is in an elliptical shape. Taking a center of the lower tube section as an origin, and major and minor axes as horizontal and vertical axes, a geometric function of the lower tube section is:

$$\frac{x^2}{R_s^2 + h_s^2} + \frac{y^2}{R_s^2} = 1,$$

where $h_s$ denotes a distance between a powder focus and a bottom of the nozzle in a vertical direction; and $R_s$ denotes a distance from the powder-collecting self-cleaning filter to a nozzle axis in a horizontal direction.

Preferably, the partition-wall-type shell includes an inner sleeve, an outer sleeve and a cooling sleeve.

The inner sleeve is sleeved into the outer sleeve and fixed at an upper end by a cover plate. The partition wall a is formed by enclosing the cover plate, the inner sleeve and the outer sleeve.

The partition wall a includes an annular partition wall located in an upper part and a plurality of powder flow channels located in a lower part and uniformly distributed in a circumferential direction of the injecting-tube body. Each powder flow channel extends along an axial direction of the injecting-tube body.

An upper end of the annular partition wall is in communication with two or more powder inlets arranged on the cover plate. A lower end of the annular partition wall is in communication with an upper end of the powder channel, a lower end of the powder channel is arranged to penetrate a lower end part of the injecting-tube body. The inner sleeve is provided with the shielding gas inlet at a position proximate to the annular partition wall.

The cooling sleeve is sleeved on a periphery of the outer sleeve, and the partition wall b is formed between the cooling sleeve and an outer wall of the outer sleeve.

Preferably, a number of the powder inlets is from 2 to 8. An angle between each powder inlet and a horizontal plane is from 10° to 90°.

Preferably, an upper end of the inner sleeve in its entirety is in a cylindrical shape, a lower end of the inner sleeve in its entirety is tapered and in a truncated-conical shape, and a hollow part of the inner sleeve is in a truncated-conical shape. A top end of the inner sleeve is processed with an annular step tapered inwardly, and the annular step together with the outer sleeve defines the annular partition wall. A plurality of straight rectangular-sectional channels extending to a bottom of the inner sleeve are arranged below the annular step. A trajectory of each rectangular-sectional channel is spatially coplanar with an axis of the inner sleeve. The annular step is connected to the rectangular-sectional channels by a trumpet-shaped notch with a larger upper portion and a smaller lower portion and proximate to the annular step. An inner wall of the outer sleeve is covered on outer sides of the rectangular-sectional channels to facilitate a closure between each rectangular-sectional channel and the inner wall of the outer sleeve to form a plurality of powder channels which are arranged independently, and the powder and the shielding gas are capable of smoothly entering the rectangular-sectional channels through the notch.

Preferably, a flange disc capable of being assembled with the cover plate is arranged on an upper end surface of the outer sleeve, and a part proximate to a lower end surface of the outer sleeve is capable of forming the partition wall b with the cooling sleeve.

A main body of the cooling sleeve is in a shape of a circular tube, inner diameter of which is in cooperation with a lower half part of the outer sleeve, and can be sleeved on a lower end of the outer sleeve. A middle part of an outer side of the cooling sleeve is provided with a protruding ring, and the cooling sleeve is provided with two adjacent holes to be connected to an inlet and an outlet of the cooling water.

Preferably, a number of the powder collecting tubes is from 2 to 8.

Preferably, the upper tube section of each powder collecting tube is fixed on an outer side of the nozzle body by fasteners, wherein a number of the fasteners is 2. One of the fasteners is an annular clamp device, and the other fastener is a pin fastener. The upper tube section is fixed on an outer side of the outer sleeve by the annular clamp device, and is connected and fixed with a pin groove arranged to penetrate upper end surfaces of the inner sleeve and the outer sleeve by the pin fastener.

According to the above technical solutions and compared with the prior art, the present disclosure has the following beneficial effects.

1. It solves the problem of accumulation of the unutilized powder and the powder difficult to clean in the traditional process of inner wall additive manufacturing, effectively improves the processing environment for the additive manufacturing on the inner wall and ensures the effective processing area, which adds the self-cleaning function to the powder nozzle for the additive manufacturing on the inner wall, so that the unutilized powder can be quickly and efficiently collected by the powder collecting system in the present disclosure, ensuring a good processing environment.

2. The design that the nozzle body in its entirety is in a cylindrical shape is advantageous for the assembly of various clamping devices and the powder-collecting self-cleaning filter on the powder nozzle body. In addition, wall bodies equidistant from the axis are arranged on both sides of the nozzle body, which increases the degree of freedom of the nozzle head of the powder-collecting self-cleaning filter in the axial direction so that it can be retracted back after the lower end of the nozzle head collides with the wall surface, and has a certain self-protection function.

3. The absorption of the nearby airflow by the powder-collecting self-cleaning filter is consistent with the trajectory, that is, after the powder conveying task is completed, of the rear end of the conveying gas, which does not affect convergence effect of the conveying gas on the powder.

Figure 1:
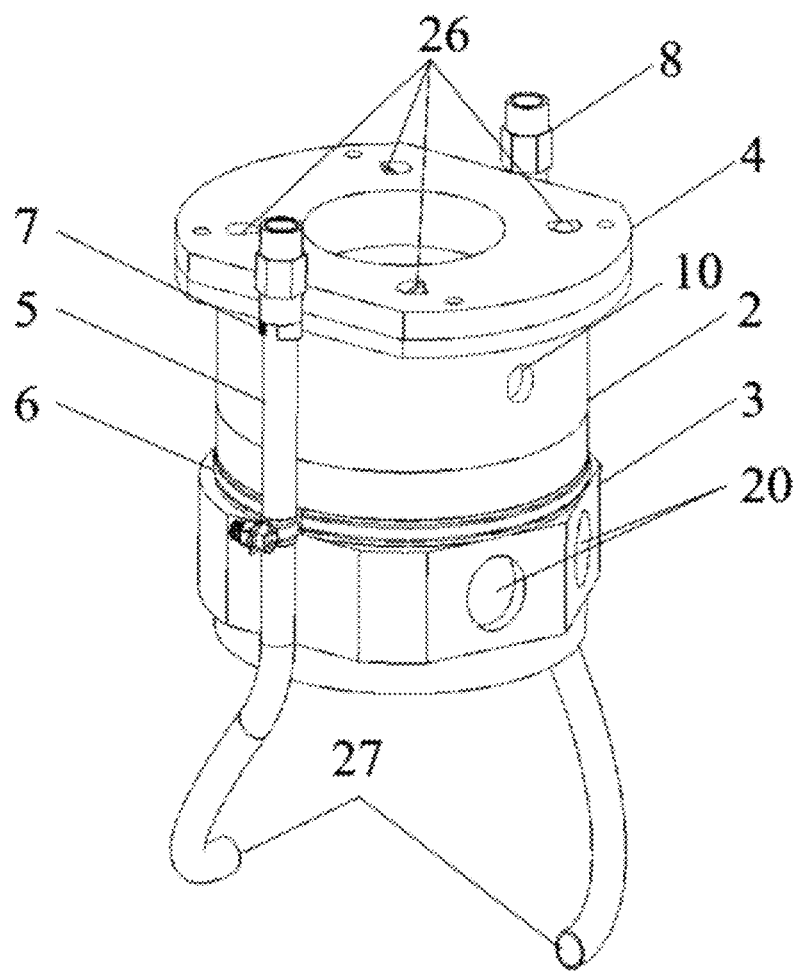
FIG. 1 illustrates a schematic diagram of a three-dimensional structure of a coaxial powder-feeding nozzle for an additive manufacturing on an inner wall having a self-cleaning function in the present disclosure.

In the drawings: 1. Inner sleeve; 2. Outer sleeve; 3. Cooling sleeve; 4. Cover plate; 5. Powder-collecting self-cleaning filter; 6. Clamping device; 7. Pin; 8. Connector; 9. Through hole of inner sleeve; 10. Through hole of outer sleeve; 11. Nozzle shielding gas inlet; 12. Annular step; 13. Trench; 14. Inner wall of outer sleeve; 15. Annular cavity; 16. Powder channel; 17. Outer surface at lower end of outer sleeve; 18. Inner wall of cooling sleeve; 19. Flow area; 20. Hole in cooling sleeve; 21 Cooling liquid inlet; 22 Cooling liquid outlet; 23. Upper surface of protruding part of cooling sleeve; 24. Annular step; 25. Pin groove; 26. Powder inlet; 27. Residual-powder inlet of powder collecting tube; 28. Fixing hole; 29. Cavity of inner sleeve; 30. Laser channel; 31. Protective glass; 32. Upper tube section of powder collecting tube.

DETAILED DESCRIPTION OF THE EMBODIMENTS

The technical solutions in the embodiments of the present invention will be described clearly and completely in combination with the accompanying drawings in the embodiments of the present invention in the followings. Apparently, the described embodiments are only a part of embodiments of the present invention rather than all the embodiments. The following description of at least one exemplary embodiment is merely illustrative in nature and is not intended in any way to limit the present invention and its application or use. All other embodiments obtained by persons of ordinary skill in the art based on the embodiments of the present invention without any creative efforts fall within the protection scope of the present invention. Unless specifically stated otherwise, the relative arrangements, expressions, and values of the components and steps set forth in these embodiments do not limit the scope of the present invention. In addition, it should be understood that for ease of description, the dimensions of the various parts shown in the drawings are not drawn in accordance with actual scale relationships. Techniques, methods, and apparatuses known to those of ordinary skill in the relevant art may not be discussed in detail, but the techniques, methods and apparatuses should be considered as part of the authorized specification if appropriate. In all examples shown and discussed herein, any specific value should be interpreted to be illustrative only but not restrictive. Therefore, other examples of the exemplary embodiments may have different values.

For ease of description, spatially relative terms such as "above", "over", "on the upper surface", "upper", and the like may be used herein to describe a spatial positional relationship between one device or feature and other devices or features shown in the drawings. It should be understood that, the spatially relative terms are intended to contain different orientations of the device in use or operation in addition to those illustrated in the drawings. For example, if the device in the drawings is inverted, the device described as "above another device or structure" or "over another device or structure" will then be oriented as "below another device or structure" or "under another device or structure". Therefore, the exemplary term "above" may include two orientations: "above" and "below". The device can also be oriented in other ways (by rotating at 90 degrees or in other orientations).

The present disclosure provides a coaxial powder-feeding nozzle used for additive manufacturing on an inner wall and having a self-cleaning function, which includes an injecting-tube body. The injecting-tube body includes a partition-wall-type shell, a powder flow area, a cooling liquid flow area and a shielding gas conveying channel. The partition-wall-type shell includes a partition wall a and a partition wall b. The partition wall b is located outside the partition wall a. The powder flow area is arranged in the partition wall a. The cooling liquid flow area is arranged in the partition wall b. The powder flow area is provided with a powder inlet and a shielding gas inlet. The cooling liquid flow area is provided with a cooling liquid inlet. A powder-collecting self-cleaning filter is arranged outside the partition-wall-type shell, wherein the powder-collecting self-cleaning filter is equipped with a set of powder collecting tubes respectively arranged on two sides of the partition-wall-type shell with respect to an axial direction, and each set of the powder collecting tubes includes at least one powder collecting tube.

Each powder collecting tube is in a two-section structure, which includes an upper tube section adopted in a straight-tube shape and a lower tube section adopted in a bent-tube shape. The upper tube section is fixed to an outer wall of the partition-wall-type shell, and an upper end of the upper tube section is provided with a connector. The connector is capable of being connected with a powder collecting system. A lower end of the lower tube section is a residual-powder inlet. The residual-powder inlet is arranged below a metal tube to be processed, and is located outside a powder convergence point of the metal tube to be processed with respect to the axial direction.

Under a combined action of a suction force applied by the powder collecting system and a self-gravitation of residual powder, the residual-powder inlet of each power collecting tube can facilitate the residual powder on an opposite side to roll down to a bottom along a wall surface of the metal tube to be processed on the same side and to be gathered at a front end of the residual-powder inlet of the powder collecting tube, so that the residual powder at the front end of the residual-powder inlet may be collected by the residue powder inlet of the powder collecting tube under the action of the suction force applied by the powder collecting system.

The inner sleeve is sleeved into the outer sleeve and fixed at an upper end by a cover plate. The partition wall a is formed by enclosing the cover plate, the inner sleeve and the outer sleeve.

The partition wall a includes an annular partition wall located in an upper part and a plurality of powder flow channels located in a lower part and uniformly distributed in a circumferential direction of the injecting-tube body. Each powder flow channel extends along an axial direction of the injecting-tube body.

An upper end of the annular partition is in communication with two or more powder inlets arranged on the cover plate, and a lower end of the annular partition wall is in communication with an upper end of the powder channel. A lower end of the powder channel is arranged to penetrate a lower end part of the injecting-tube body, and the inner sleeve is provided with the shielding gas inlet at a position proximate to the annular partition wall.

The cooling sleeve is sleeved on a periphery of the outer sleeve, and a partition wall b is formed between the cooling sleeve and an outer wall of the outer sleeve.

The inner sleeve in its entirety is in a "bullet shape" with an upper end in a cylindrical shape and a lower end in a truncated-conical shape. A top end of the inner sleeve is provided with an annular step tapered inwardly. An outer side of the inner sleeve is provided with a plurality of rectangular cross-section channels which are spatially coplanar with an axis of the inner sleeve. The rectangular-sectional channels are equidistantly distributed on an outer wall of the inner sleeve. A trumpet-shaped notch with a larger upper portion and a smaller lower portion is arranged at a connection between each rectangular cross-section channel and the annular step. A cross-sectional shape of the outer sleeve in its entirety is in a shape of a Chinese character "呂". An inner wall of the outer sleeve is consistent with the outer wall of the inner sleeve in size, which can be fitted together after assembly. The inner sleeve and the outer sleeve are together constrained a flow area for the powder and the shielding gas, and fine metal powder particles can be converged directly below the nozzle along each flow channel. A truncated-conical light channel is arranged inside the inner sleeve, an annular step protruding outwardly is arranged on an upper side of the light channel, and a light path protection mirror is placed on a thread of the annular step.

Above the nozzle is the cover plate in a form of a two-stage disc-shaped step with a larger upper portion and a smaller lower portion. A radius of a lower part of the cover plate is equal to a radius of the protective glass (or the annular step where the protective glass is placed) in the inner sleeve. An upper part of the cover plate is congruent with a flange disc at an upper end of the outer sleeve in shape, and is respectively provided with four corresponding bolt holes for convenient fixation. An inner side of the cover plate is provided with inclined holes as the powder inlet, which is in communication with the powder flow area formed by assembling the inner sleeve and the outer sleeve. Laser passes through a central channel, through the protective mirror, focuses on the axis, and interacts with a powder focal point for deposition.

Upper sides of the outer sleeve and the inner sleeve are provided with positioning pin holes, and relative positions of the outer sleeve and the inner sleeve can be positioned through pins. After the inner sleeve and outer sleeve are assembled, a through hole (shielding gas inlet) is designed on a wall surface of an inner powder-free flow area. After sleeving installation, axes of the through holes are guaranteed to be coincident through pin positioning to form a "light-path protective gas inlet" from the central light-channel through the side wall to the outside, which can provide the shielding gas to protect the light path part of the nozzle for the central light channel, and prevent the protective mirror surface from being adhered with rebounded powder particles since they have not been utilized during the deposition process.

Under the flange disc at a top of the outer sleeve is a circular tube section. The outer diameter of the circular tube section is the same as that of the cooling sleeve. Under the circular tube section is a inwardly-tapered annular step, and an outer diameter of the annular step is in cooperation with an inner diameter of the cooling sleeve. Below the annular step is a hollow truncated-conical (funnel-shaped) thin wall, shape of which is in cooperation with a shape of the inner sleeve, and a disc expands outwardly from a bottom of the thin wall. A radius of the disc is in cooperation with an inner diameter of the cooling sleeve. In this way, the cooling sleeve is cooperatively mounted outside a lower half part of the outer sleeve to form an annular space (partition wall b) under a joint constraint of the cooling sleeve and the outer sleeve, in which the cooling liquid flows to cool the nozzle head and circulates. A ring protrudes from a middle part of the cooling sleeve, and planes (on both sides of the nozzle head) tangent to a main circular tube are respectively processed on the ring to prevent an interference between the powder-collecting self-cleaning filter and the cooling sleeve, which facilitates a placement of the powder-collecting self-cleaning filter. Two planes are processed. The inlet and outlet of the cooling liquid are arranged on the same side of the nozzle head (the side opposite to the feeding direction), and in order to facilitate processing and installation, corresponding planes are also processed in the same way.

The powder-collecting self-cleaning filters are fixed on both sides of the nozzle head (perpendicular to the feeding direction of the nozzle head) to collect unutilized powder (residual powder particles) in the processing. The entire powder nozzle head has two fixtures for the powder-collecting self-cleaning filters. The cooling sleeve can assist the positioning of the fixtures for the powder-collecting self-cleaning filters in an axial direction of the nozzle head. A body of a clamping part (i.e. annular clamping device) configured for fixing the powder-collecting self-cleaning filter is in an annular shape. An inner diameter of the clamping part forms a clearance fit with an inner diameter of the cooling sleeve, which can be easily sleeved outside the cooling sleeve, thus completing a positioning in a horizontal direction. Moreover, a protruding ring in a middle part of the cooling sleeve, where a ring surface is in contact with the fixture, provides a supporting force corresponding to its gravity for the fixture, so as to achieve a purpose of positioning the fixture on an axial direction. A plurality of annular clamps configured for clamping the powder-collecting self-cleaning filters can be derived on both sides of the annular clamping device (annular clamping component), and a position on a horizontal plane is completed by sleeving the powder-collecting self-cleaning filter into the annular clamps.

According to the rules of powder movement, required is a suitable airflow velocity at which the air flow acts on the powder and cause the powder to move. The airflow velocity will be determined by factors such as powder shape, characteristic size, material properties and friction coefficient at the interface, and the velocity is defined as a starting velocity, which is recorded here as $u_q$. Since powder particles has better spherical degree and the characteristic size distribution is more concentrated, parameters such as resistance coefficient and friction coefficient are constant values for all particles during the deposition process of most materials. Functions of the material properties such as material density, conveying gas density, and maximum particle size of the particles may change with the changes in forming processing and environmental conditions. Therefore, the starting velocity of the powder particles in the deposition process can be expressed as formula (1):

$$u_q = 2.44\sqrt{\frac{d_s(\rho_s - \rho)}{\rho}}, \qquad (1)$$

where $d_s$ denotes a maximum particle size of the powder particles, $\rho_s$ denotes a density of the powder particle material, and $\rho$ denotes a density of conveying gas. Physical parameters of the powder and the gas particles under different processing conditions are substituted into formula (1) to obtain the starting velocity required for the powder particles in the processing process.

An upper half structure of the powder-collecting self-cleaning filter is a straight tube, and the powder is required to move upward in the straight tube. Therefore, a velocity of gas in the tube section is also required to meet certain requirements. The value of the velocity is referred to as a suspension velocity, which is recorded as $u_f$. Since shapes and physical parameters of metal powder particles during the deposition process are uniform, the resistance coefficient can also be defined as a constant value for all powder particles. The suspension velocity of the powder particles in the deposition process can be expressed as formula (2):

$$u_f = 5.449\sqrt{\frac{d_s(\rho_s - \rho)}{\rho}}. \qquad (2)$$

Similarly, the suspension velocity required in the processing process is obtained by substituting $d_s$, $\rho_s$ and $\rho$ of the powder and the gas particles under different processing conditions into the above formula.

Generally, a normal conveying of the powder particles in a vertical tube section can be ensured, until the airflow velocity in the channel reaches 2 to 3.5 times the suspension velocity. Therefore, a range of airflow velocity $v_r$ provided at an inlet of a top end of the powder-collecting self-cleaning filter is:

$$10.90\sqrt{\frac{d_s(\rho_s - \rho)}{\rho}} \leq v_r \leq 19.07\sqrt{\frac{d_s(\rho_s - \rho)}{\rho}}. \qquad (3)$$

In the deposition process, after the laser focus is adjusted, most of the powder can be processed by the laser and achieve deposition during the reaction process, while a volume fraction of the remaining powder, which we called residual powder here, to total powder particles is η. n powder inlets are integrated at a top of the nozzle head. A radius of the powder inlets is defined as r, while a radius of an inlet of the powder-collecting self-cleaning filter is defined as R. The radius R of the inlet of the powder-collecting self-cleaning filter can be defined as:

$$R = r\sqrt{n\eta}. \qquad (4)$$

A position of the collecting inlet of the powder-collecting self-cleaning filter can be accurately calculated according to a surrounding airflow velocity. In order to enable the inlet airflow to have a function of starting the powder particles, it is necessary to ensure that the airflow velocity of the powder particles is 1.5 times the starting velocity. Therefore, a distance h from the inlet to a bottom of the tube can be calculated by the following inequality:

$$h \leq \frac{r\sqrt{n\eta}(\sqrt{v_r} - 1.5\sqrt{u_q})}{1.5\sqrt{u_q}}. \qquad (5)$$

Upper side edges of the inner and outer sleeves are provided with positioning pin holes for positioning nozzle shielding gas through hole on the inner and outer sleeve. Moreover, the positioning holes are also capable of assisting the positioning of an upper part of the powder-collecting self-cleaning filter: a fixing ring configured for fixing the powder-collecting self-cleaning filter is machined at the other end of the positioning pin, and the powder-collecting self-cleaning filter is sleeved in the fixing ring. Similar with the above-mentioned fixtures installed around the cooling sleeve, the fixing ring here also limits a freedom degree of the powder-collecting self-cleaning filter in a horizontal direction, and under a combined action of the both, a positioning system of the powder-collecting self-cleaning filters can have better stability. A top end of the powder-collecting self-cleaning filter is connected with the powder collecting system at a rear end by a connector. The connector is tightly sleeved on the top of the powder-collecting self-cleaning filter, and the fixing ring provides an upward support force to the connector, so that the entire powder-collecting self-cleaning filter can be fixed in an axial position.

A lower half portion of the powder-collecting self-cleaning filter is a lower tube section arranged in a bent shape, a tail-end of which is a residual-powder inlet. After the powder particles processed by the laser, the conveying gas and the unutilized residual powder enter the powder collection system through the residual-powder inlet. The lower half portion of the powder-collecting self-cleaning filter is a bent tube. A projection of a tube section on a horizontal plane, which extends from a bottom of the nozzle head downwards for a distance (along the axial direction of the nozzle head) does not overlap a projection of the laser nozzle device itself on the horizontal plane (therefore, when the powder-collecting self-cleaning filter is translated upwards along the axial direction, the collecting tube and the nozzle head will not interfere with each other over this distance). A vertical distance between the powder focus and a bottom of the nozzle is recorded as $h_s$, and a distance from the powder-collecting self-cleaning filter to a nozzle axis in a horizontal direction is constantly $R_s$. When the powder-collecting self-cleaning filter is observed in a side view, the trajectory of the bent tube of the powder-collecting self-cleaning filter is a straight line. Therefore, the lower half bent tube of the powder-collecting self-cleaning filter is in an elliptical shape. Taking a center of the lower half bent tube as an origin and major and minor axes as horizontal and vertical axes, a geometric function of the lower half bent tube is:

$$\frac{x^2}{R_s^2 + h_s^2} + \frac{y^2}{R_s^2} = 1. \tag{6}$$

After the conveying shielding gas brings powder particles to help the metal powder particles to be converged and to be processed by the laser, the shielding gas flows horizontally to both sides with respect to the axial direction of the steel tube along the metal tube deposition wall under the constraint of a wall of the metal tube to be processed. However, the residual powder particles (the powder that has not been adhered to a surface of the metal tube) in the deposition process are rebounded in various directions after collision with the metal tube substrate. Under the condition of the processing on the inner wall, the nozzle head processes equivalently in a sealed space, and the residual powder will not splash around as in an open space, rather will be gathered at a bottom of the processed metal tube due to gravity and tube wall constraints. An inlet of the powder-collecting self-cleaning filter is arranged at a bottom of the metal tube to be processed and at a certain distance from the powder focus. The facing direction, subject to the feeding direction of deposition, of the powder-collecting self-cleaning filter inlet at a front end of the nozzle is the same as a direction of the linear velocity of the tube wall (preferred option), while a facing direction of the collecting tube inlet at the rear end is opposite to the direction of the linear velocity of the tube wall. The powder collecting system provides a suction force for the collecting tube inlet to the surrounding gas and powder. According to the facing direction of the inlet of the powder-collecting self-cleaning filter at the front end of the nozzle, along the processing feeding direction, an internal space of the metal tube can be divided into two equal areas on the left and right through a vertical section in the axial direction (the axial direction of the metal tube is perpendicular to a symmetrical plane to the ground surface). During the processing, the residual powder particles are splashed to the metal walls on both sides of the section. A wall surface on a side opposite to the inlet of the powder-collecting self-cleaning filter is rolled upward relative to the ground, which exerts a friction force towards the sided up and outwardly from the axis of the tube to the residual particles. However, due to the gravity, the particles will be rolled down along the wall to the bottom of the metal tube. Under the combined action of the gravity and the friction, the residual particles on the splashed side will be rolled down to a position at the bottom of the metal tube, deviating from the symmetry plane and approaching the original side, where is right in front of the inlet of the powder-collecting self-cleaning filter. However, a wall surface opposite to the powder-collecting self-cleaning filter at the front end of the nozzle exerts an oblique downward (inclined to the inner side of the axis) friction to the powder particles splashed on the wall. Under the action of the gravity and the friction, the residual powders may cross over the symmetry plane of the metal tube to be gathered to a bottom of a tube space on the other side, and those powders are gathered at the front end of the inlet of the powder-collecting self-cleaning filter. The rear end of the powder collecting system provides a proper airflow velocity from the inlet to the inner flow area of the collecting tube, so that the surrounding gas carrying the residual powder enters the powder collecting system to the complete self-cleaning.

During the processing, the conveying gas contacts the wall under a constraint of the inner wall. Due to a low viscosity of the conveying gas, it will not be rotated with the tube, rather may move along and on a bottom of the flow area in the tube from the powder gathering point to two sides with respect to an axial direction of the metal tube. The inlet of the powder-collecting self-cleaning filter is located at a certain distance from the powder gathering point on both sides of the metal tube with respect to of the axial direction. After the powders are conveyed by the conveying protector to gather them, and processed by the laser, the movement trajectory of the conveying protector in the space limited by the tube walls is relatively denser near the powder-collecting self-cleaning filter. A velocity gradient in the vertical direction is large, a flow velocity near the upper and lower wall surfaces of the metal tube in the vertical direction is faster, and a flow volume is large. A large amount of used convey shielding gas passes through the inlet of the collecting tube, which meets the conditions for carrying residual powder into the collecting system. Therefore, it is possible to collect the unutilized residual powder without affecting the powder convergence when the powder nozzle is working, so as to obtain the self-cleaning effect in the processing process.

The technical solutions of the present disclosure will be described in detail below in combination with a specific embodiment.

In the embodiment, Inconel 718 is used as a deposition material on the inner wall of the metal tube, argon is the conveying shielding gas, and a particle size of the adopted powder ranges from 30 μm to 100 μm.

Figure 2:
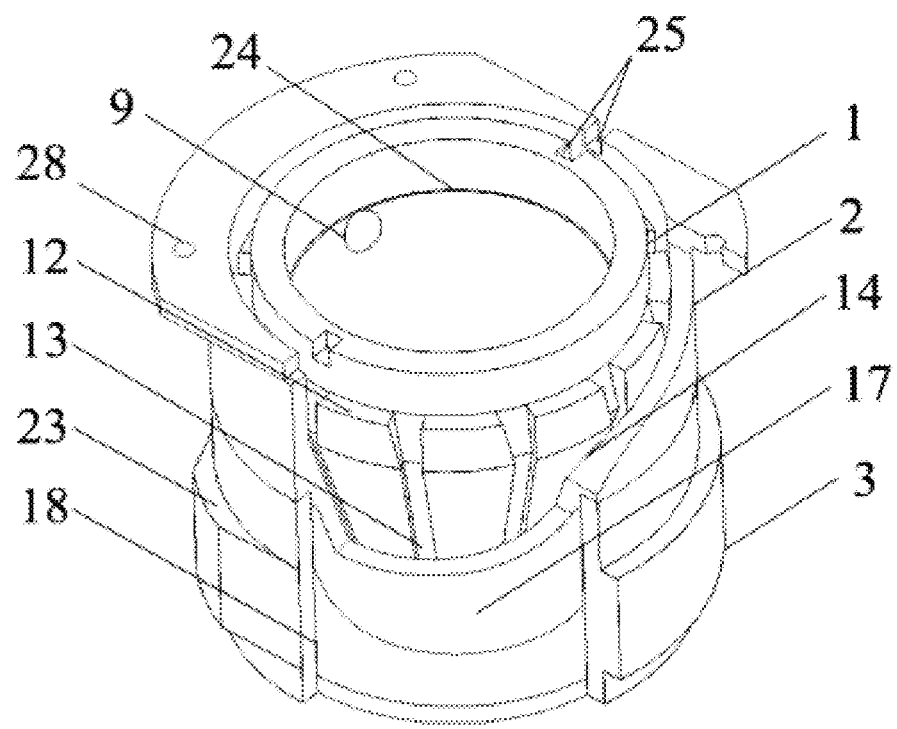
FIG. 2 illustrates a partial sectional schematic diagram of a powder nozzle part of the coaxial powder-feeding nozzle shown in FIG. 1.
Figure 3A:
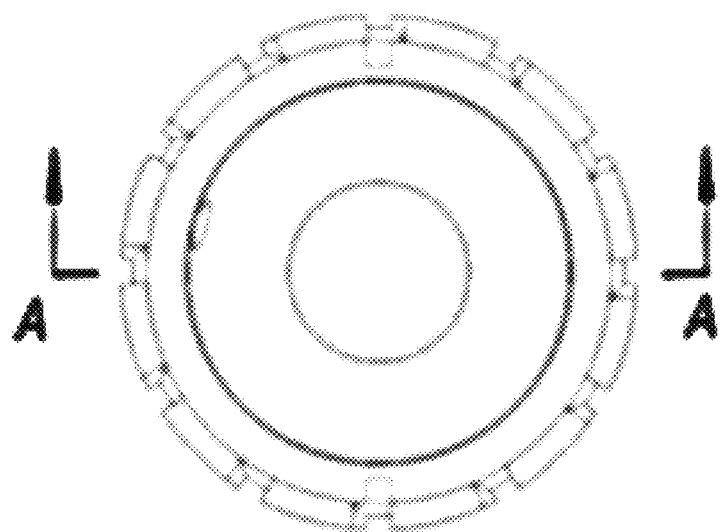
FIG. 3a illustrates a top view of an inner sleeve shown in FIG. 2.
Figure 3B:
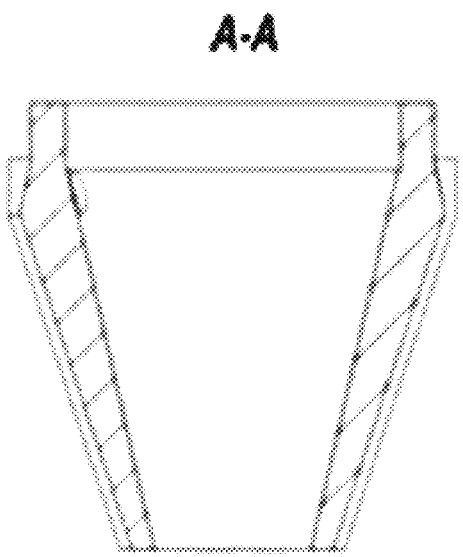
FIG. 3b illustrates a sectional view of the inner sleeve shown in FIG. 3a taken along A-A.
Figure 3C:
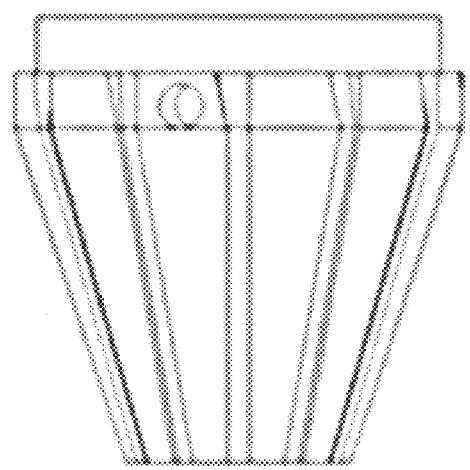
FIG. 3c illustrates a side view of FIG. 3b.
Figure 3D:
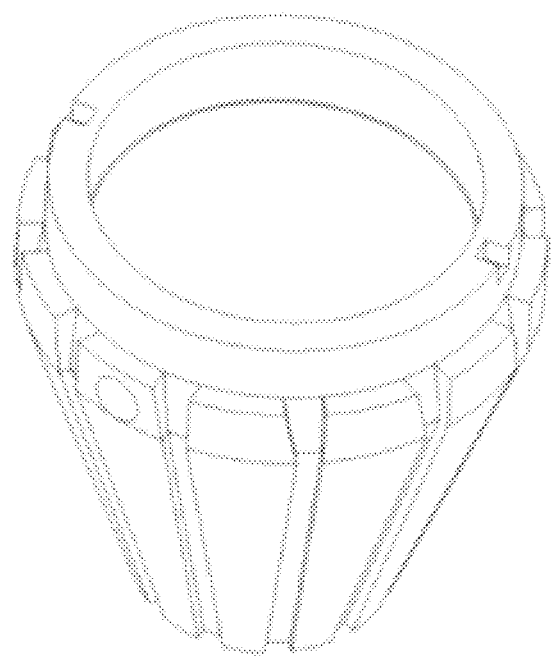
FIG. 3d is a schematic diagram of a three-dimensional structure of the inner sleeve shown in FIG. 2.
Figure 4:
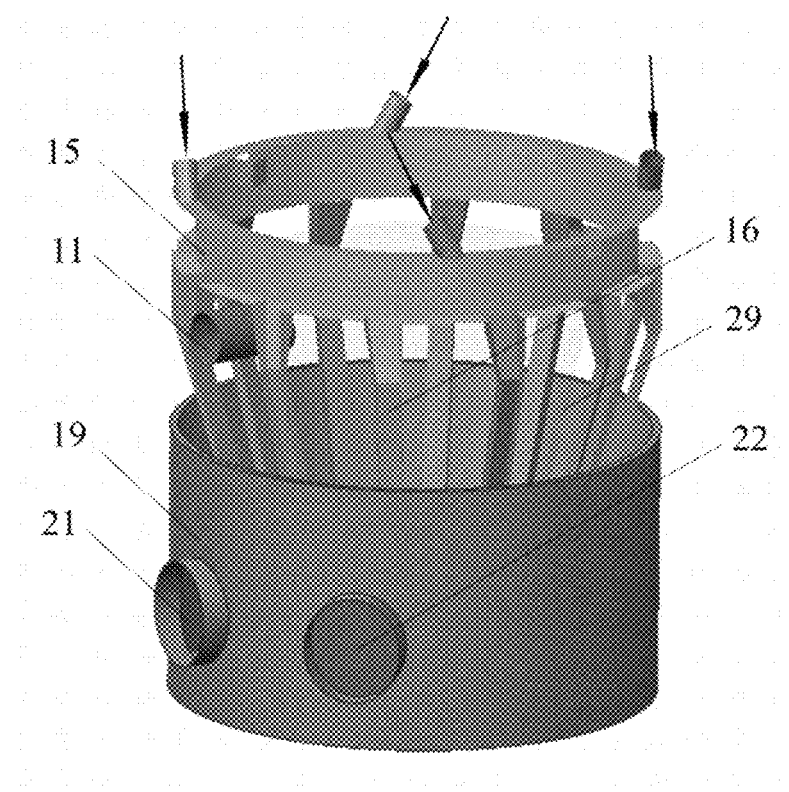
FIG. 4 illustrates a schematic diagram of a three-dimensional structure of wall surfaces in different flow areas shown in FIG. 2.
Figure 5:
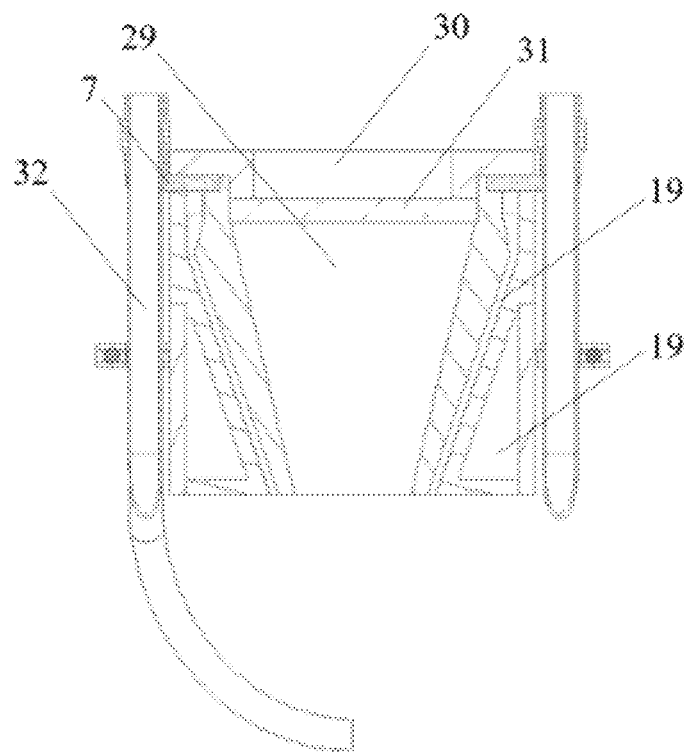
FIG. 5 illustrates a cross-sectional view of the coaxial powder-feeding nozzle shown in FIG. 1.

FIG. 1 to FIG. 5 illustrate a specific structure of the embodiment. As illustrated in FIG. 2, the powder nozzle part includes an inner sleeve 1, an outer sleeve 2 and a cooling sleeve 3. The inner sleeve 1 is sleeved in the outer sleeve 2. Moreover, the cooling sleeve 3 is sleeved on a lower end of the outer sleeve 2. As illustrated in FIGS. 3a to 3d, an outer wall surface at an upper end of the inner sleeve 1 is provided with an annular step 12 depressed inwardly. Twelve straight trenches 13 depressed inwardly are arranged at a lower side of the annular step 12 along a conical wall surface. The trenches 13 are in the same plane with an axis of the inner sleeve 1 and are evenly distributed along a periphery of the inner sleeve 1. The outer sleeve 2 is sleeved on an outer side of the inner sleeve 1, an inner wall 14 of the outer sleeve 2, the trenches 13 and the annular step 12 together limit an area for the movements of the powder particles inside the nozzle head. As illustrated in FIG. 4, a flow area of the powders includes an annular cavity 15 and powder flow channels 16, which are connected with each other. The powder particles carried by the conveying shielding gas enter the flow area through powder inlets 26, and enter the annular cavity 15 first. After a certain homogenization, the powder particles are converged after passing through the powder channels 16, where a radius of the powder inlets is 2 mm, while an unutilization rate of the powder is 0.4, and a radius of the powder self-cleaning inlet is calculated 2.5 mm.

Top ends of the inner sleeve 1 and the outer sleeve 2 are provided with pin-grooves 25. After the inner sleeve 1 and the outer sleeve 2 are sleeved and installed with each other, pin fixtures 7 are installed and locked in the pin-grooves 25 to position the inner sleeve and the outer sleeve. A through hole 9 is arranged at a position where there is no groove on an outer wall of the inner sleeve, and a through hole 10 is arranged on an inner wall of the outer sleeve 2 opposite to the through hole 9. Under a positioning of the pins 7, axes of the two holes are coincide with each other to form a nozzle shielding gas inlet 11. The nozzle shielding gas inlet 11 is in communication with a cavity 29 in the inner sleeve 1, that is the shielding gas flow area.

The cooling sleeve 3 is in a hollow cylindrical shape, and an annular protrusion is arranged in middle of the cooling sleeve 3. On the protruding ring, two adjacent planes are generated by machining, and two holes 20 are arranged on the planes. The cooling sleeve 3 is sleeved at a lower end of the outer sleeve 2. An outer surface 17 at the lower end of the outer sleeve and an inner wall 18 of the cooling sleeve together form a wall surface limiting a cooling liquid flow area 19. The cooling liquid enters the flow area 19 through a cooling liquid inlet 21, and then flow out from the cooling liquid outlet 22. Heat received by the bottom of the outer sleeve 3 caused by radiation is taken away by the cooling liquid in the flow area 19, which ensures that plastic tubes at the powder inlets 26 can be at an appropriate environment temperature in operation.

An upper surface 23 outwardly protruding from a middle portion of the cooling sleeve 3 provides a positioning and support in the axial direction of the nozzle for a clamping device 6 of the powder-collecting self-cleaning filter. As illustrated in FIG. 1, the nozzle in this embodiment has two powder-collecting self-cleaning filters 5, which are fixed on left and right sides through the clamping devices 6. As illustrated in FIG. 1, a main body of the clamping device 6 here is in semicircular shape, and an inner diameter of the clamping device 6 is the same as an outer diameter of a main body of the cooling sleeve 3, which makes components of the clamping devices are mounted opposite to each other on an outer side of the cooling sleeve 3, and the clamping device 6 is connected and sleeved on a periphery of the cooling sleeve by smaller bolts. Under a cooperation of an annular surface 23 on the cooling sleeve, the clamping device 6 is fixed relative to the powder nozzle. Two circular holes are arranged on both sides of the clamping device, an inner diameter of which is the same as an outer diameter of the powder-collecting self-cleaning filter 5, so that the powder-collecting self-cleaning filter can be mounted exactly in it. A tail end of each pin fixture 7 is fixed in each pin groove an upper end of which is pressed by a cover plate 4 to ensure that each pin fixture is fixed in the axial direction. An arc-shaped frame 7 is arranged on a front end of each pin fixture 7, an opening of each arc-shaped frame 7 is opened outwardly, and an inner diameter of each arc-shaped frame 7 is the same as an outer diameter of each powder-collecting self-cleaning filter 5 to positioning each powder-collecting self-cleaning filter 5 and increase its stability. A connector 8 is configured to help positioning each powder-collecting self-cleaning filter 5 in the axial direction. Each connector 8 robustly covers the top of each powder-collecting self-cleaning filter 5. An upward support force exerted by the pin fixture 7 to the connector is transferred to the powder-collecting self-cleaning filter 5, so that each powder-collecting self-cleaning filter 5 is also fixed axially relative to the powder nozzle.

An annular step for placing a protective glass 31 is machined on an inner side of the inner sleeve 1. After the protective glass 31 is placed on the annular step, a space in the nozzle is divided into two sides. One side is a laser channel 30, and the other side is the nozzle shielding gas flow area 29. The laser comes from the channel 30, passes through the protective glass 31 and the shielding gas flow area 29, and focuses below the nozzle and interacts with the powder.

A lower part of the powder-collecting self-cleaning filter 5 is a bent tube. A bottom of the bent tube is provided with an airflow inlet 26, through which the reacted shielding gas and unreacted powder enter the powder collecting system 32. The projection of a section of the bent tube under the powder-collecting self-cleaning filter 5 for a certain distance on a horizontal plane does not overlap a projection of the laser nozzle device itself on the horizontal plane.

Figure 6:
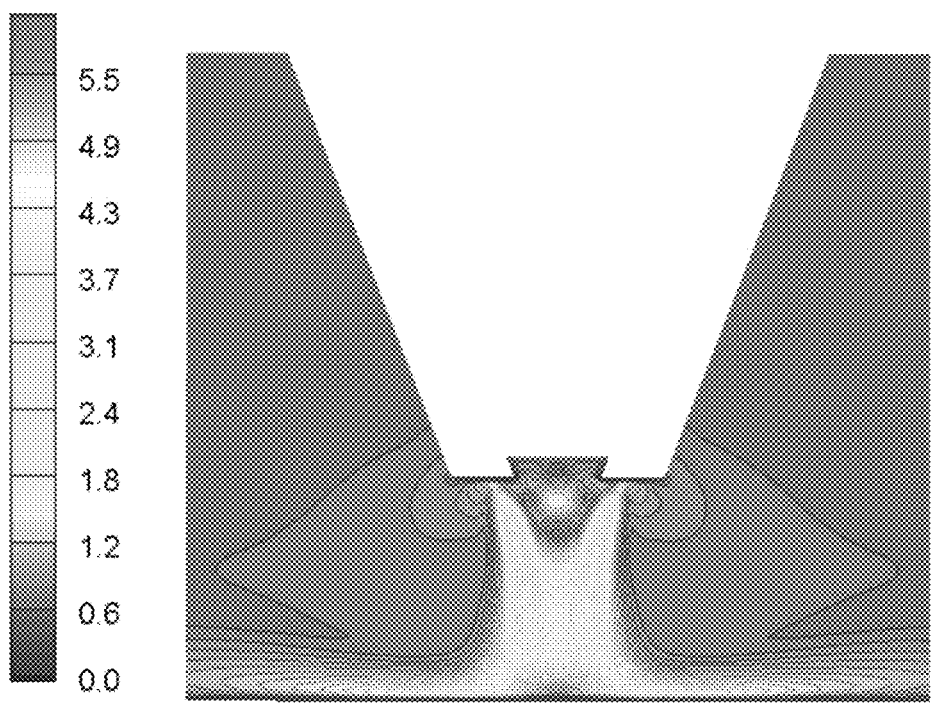
FIG. 6 illustrates a simulation cloud diagram of flow field trajectorys during powder feeding process of the coaxial nozzle.

As illustrated in FIG. 6, a movement trajectory of powder flow in processing is described. After the nozzle shielding gas carries powder particles for the convergence and is processed by the laser, due to the constraint of the tube wall, the shielding gas will flow horizontally to both sides with respect to the axis direction of the steel tube axis along the deposition wall of the metal tube. However, the powder particles that are not used in the deposition process, that is, the powder that cannot be adhered to the surface of the metal tube, may be rebounded in various directions. Due to a constraint of the metal tube in the radial direction, the powder will be accumulated at a bottom of the metal tube. An inlet of the bent tube is arranged at a certain distance from the powder focus. In a deposition feeding direction, a facing direction of an orifice of the powder-collecting self-cleaning filter at a front end of the nozzle is preferred in the same direction as a linear velocity of the metal tube wall, while the facing direction of the collecting tube at a rear end is in an opposite direction to a linear velocity of the metal tube. A suction force is exerted by the powder collecting system for the orifice to surrounding gas and powder. In the processing, the powder splashed at a front end is carried to the orifice of the powder-collecting self-cleaning filter by the rotating metal tube, and due to the suction of the orifice, it enters the powder collecting system along with the surrounding gas.

A density of Inconel 718 is 8240 kg/m$^3$. When a room temperature of argon is 20° C., the density of Inconel 718 is 1.7837 kg/m$^3$, wherein a radius of the maximum powder particle is 50 μm. After calculation, a starting speed of the powder is 1.17 m/s, while a suspension speed is 2.62 m/s. Therefore, a velocity of airflow required at a top of the powder-collecting self-cleaning filter ranges from 5.24 m/s to 9.2 m/s. In order to ensure the smooth transportation of the powders in the tube, the airflow velocity added to a top inlet of the powder-collecting self-cleaning filter is set to 7 m/s. Thus, a distance between the residual-powder inlet at a tail end of the powder-collecting self-cleaning filter and a bottom of the deposition tube should be less than 1.5 mm. To ensure a safety in processing, the distance between a bottom of the residual-powder inlet and the deposition wall surface is maintained at 0.5 mm.

In this embodiment, the self-cleaning nozzle has a good performance in the processing process, and equal to or greater than 90% of the residual powder is collected through the powder-collecting self-cleaning filters, which ensures a deposition quality of additive processing on an inner wall.

The above embodiments are preferred embodiments of the present disclosure, but the embodiments of the present disclosure are not limited by the above embodiments. Any other changes, modifications, replacements, combinations, simplifications that do not deviate from the spirit and principle of the present disclosure should be equivalent alternative methods, and are included in the scope of protection of the present disclosure.

What is claimed is:

1. A coaxial powder-feeding nozzle used for additive manufacturing on an inner wall having a self-cleaning function, comprising an injecting-tube body, wherein the injecting-tube body includes a partition-wall shell, a powder flow area, a cooling liquid flow area and a shielding gas conveying channel, the partition-wall shell includes a partition wall a and a partition wall b, the partition wall b is located outside the partition wall a, the powder flow area is arranged in the partition wall a, the cooling liquid flow area is arranged in the partition wall b, the powder flow area is provided with a powder inlet and a shielding gas inlet, the cooling liquid flow area is provided with a cooling liquid inlet, wherein a powder-collecting self-cleaning filter is arranged outside the partition-wall shell, the powder-collecting self-cleaning filter is equipped with a set of powder collecting tubes respectively arranged on two sides of the partition-wall shell with respect to an axial direction, and each set of the powder collecting tubes includes at least one powder collecting tube, each powder collecting tube is in a two-section structure, and includes an upper tube section adopted in a straight-tube shape and a lower tube section adopted in a bent-tube shape, the upper tube section is fixed to an outer wall of the partition-wall shell, and an upper end of the upper tube section is provided with a connector, the connector is capable of being connected with a powder collecting system, a lower end of the lower tube section is a residual-powder inlet, the residual-powder inlet is arranged below a metal tube to be processed, and is located outside a powder convergence point of the metal tube to be processed with respect to the axial direction; and under a combined action of a suction force applied by the powder collecting system and a self-gravitation of residual powder, the residual-powder inlet of each powder collecting tube is capable of facilitating residual powder on an opposite side to roll down to a bottom along a wall surface of the metal tube to be processed on a same side, and to be accumulated at a front end of the residual-powder inlet of the powder collecting tube, and the residue powder inlet of the powder collecting tube is capable of collecting the residual powder at the front end of the powder collecting tube under an action of the suction force applied by the powder collecting system.

2. The coaxial powder-feeding nozzle used for additive manufacturing on the inner wall having the self-cleaning function according to claim 1, wherein a distance h between the residual-powder inlet and the bottom of the metal tube to be processed satisfies:

$$h \leq \frac{r\sqrt{n\eta}(\sqrt{v_r} - 1.5\sqrt{u_q})}{1.5\sqrt{u_q}},$$

where n denotes a number of powder inlets being in communication with the powder flow area; r denotes a radius of powder inlets; η denotes a volume fraction of residual powder particles to total powder particles passed through each powder inlet; $v_r$ denotes an airflow velocity at a top of the upper tube section; and $u_q$ is a starting velocity of the powder particles, wherein $$u_q = 2.44\sqrt{\frac{d_s(\rho_s - \rho)}{\rho}},$$

and
a range of the airflow velocity $v_r$ is as follows:

$$10.90\sqrt{\frac{d_s(\rho_s - \rho)}{\rho}} \leq v_r \leq 19.07\sqrt{\frac{d_s(\rho_s - \rho)}{\rho}},$$

where $d_s$ denotes a maximum particle size of the powder particles, $\rho_s$ denotes a density of the powder particle material, and $\rho$ denotes a density of conveying gas.

3. The coaxial powder-feeding nozzle for additive manufacturing on the inner wall having the self-cleaning function according to claim 1, wherein a radius R of the residual-powder inlet satisfies:

$$R = r\sqrt{n\eta}.$$

where n denotes a number of powder inlets in communication with the powder flow area; r denotes a radius of powder inlets; and η denotes a volume fraction of the residual powder particles to total powder particles passed through each powder inlet.

4. The coaxial powder-feeding nozzle for additive manufacturing on the inner wall having the self-cleaning function according to claim 1, wherein a trajectory profile of the lower tube section is in an elliptical shape, and taking a center of the lower tube section as an origin and major and minor axes as horizontal and vertical axes, a geometric function of the lower tube section is:

$$\frac{x^2}{R_s^2 + h_s^2} + \frac{y^2}{R_s^2} = 1,$$

where $h_s$ denotes a distance between a powder focus and a bottom of the nozzle in a vertical direction; and $R_s$, denotes a distance from the powder-collecting self-cleaning filter to a nozzle axis in a horizontal direction.

5. The coaxial powder-feeding nozzle used for additive manufacturing on the inner wall having the self-cleaning function according to claim 1, wherein the partition-wall shell comprises an inner sleeve, an outer sleeve and a cooling sleeve; the inner sleeve is sleeved into the outer sleeve and fixed at an upper end by a cover plate, and the partition wall a is formed by enclosing the cover plate, the inner sleeve and the outer sleeve; the partition wall a includes an annular partition wall located at an upper part, and a plurality of powder flow channels located at a lower part and uniformly distributed in a circumferential direction of the injecting-tube body, and each powder flow channel extends along an axial direction of the injecting-tube body; an upper end of the annular partition wall is in communication with two or more powder inlets arranged on the cover plate, a lower end of the annular partition wall is in communication with an upper end of the powder channels, a lower end of the powder channels is arranged to penetrate a lower end part of the injecting-tube body, and the inner sleeve is provided with the shielding gas inlet at a position proximate to the annular partition wall; and the cooling sleeve is sleeved on a periphery of the outer sleeve, and the partition wall b is formed between the cooling sleeve and an outer wall of the outer sleeve.

6. The coaxial powder-feeding nozzle for additive manufacturing on the inner wall having the self-cleaning function according to claim 5, wherein a number of the powder inlets is from 2 to 8, an angle between each powder inlet and a horizontal plane is from 10° to 90°.

7. The coaxial powder-feeding nozzle used for additive manufacturing on the inner wall having the self-cleaning function according to claim 5, wherein an upper end of the inner sleeve in its entirety is in a cylindrical shape, a lower end of the inner sleeve in its entirety is tapered and in a truncated-conical shape, and a hollow part of the inner sleeve is in a truncated-conical shape, a top end of the inner sleeve is processed with an annular step tapered inwardly, and the annular step together with the outer sleeve defines the annular partition wall, a plurality of straight rectangular-sectional channels extending to a bottom of the inner sleeve are arranged below the annular step, a trajectory of each rectangular-sectional channel is spatially coplanar with an axis of the inner sleeve, the annular step is connected to the rectangular-sectional channels by a trumpet-shaped notch with a larger upper portion and a smaller lower portion and proximate to the annular step, an inner wall of the outer sleeve covers outer sides of the rectangular-sectional channels to facilitate a closure between each rectangular-sectional channel and the inner wall of the outer sleeve to form a plurality of powder channels which are arranged independently to each other, and the powder and the shielding gas are capable of smoothly entering the rectangular-sectional channels through the notch.

8. The coaxial powder-feeding nozzle used for additive manufacturing on the inner wall having the self-cleaning function according to claim 5, wherein a flange disc capable of being assembled with the cover plate is arranged on an upper end surface of the outer sleeve, and a part proximate to a lower end surface is capable of forming the partition wall b with the cooling sleeve; and a main body of the cooling sleeve is in a shape of a circular tube, an inner diameter of the cooling sleeve is in cooperation with a lower half part of the outer sleeve and capable of being sleeved on a lower end of the outer sleeve, a protruding ring is arranged in middle of an outer side of the cooling sleeve, and the cooling sleeve is provided with two adjacent holes configured to be connected to an inlet and an outlet of the cooling water, respectively.

9. The coaxial powder-feeding nozzle used for additive manufacturing on the inner wall having the self-cleaning function according to claim 5, wherein a number of the powder collecting tubes is from 2 to 8.

10. The coaxial powder-feeding nozzle used for additive manufacturing on the inner wall having the self-cleaning function according to claim 5, wherein the upper tube section of each powder collecting tube is fixed on an outer side of a nozzle body by fasteners, wherein a number of the fasteners is 2, one of the fasteners is an annular clamp device, and another one of the fasteners is a pin fastener, the upper tube section is fixed on an outer side of the outer sleeve by the annular clamp device, and is connected and fixed with pin grooves arranged on upper end surfaces of the inner sleeve and the outer sleeve by the pin fastener.

* * * * *